United States Patent [19]

Vidrine et al.

[11] Patent Number: 4,632,553
[45] Date of Patent: Dec. 30, 1986

[54] SILICON BEAMSPLITTER

[75] Inventors: D. Warren Vidrine; Charles R. Anderson, both of Madison, Wis.

[73] Assignee: Nicolet Instrument Corporation, Madison, Wis.

[21] Appl. No.: 705,095

[22] Filed: Feb. 25, 1985

[51] Int. Cl.⁴ .................... G01J 3/45; G02B 27/14
[52] U.S. Cl. .................... 356/346; 350/1.1; 350/171
[58] Field of Search ............... 350/1.1, 169, 173, 174, 350/179, 171; 356/346

[56] References Cited

U.S. PATENT DOCUMENTS 4,278,351 7/1981 Frosch ........................... 356/346

FOREIGN PATENT DOCUMENTS 1292237 of 1962 France ........................... 350/171
310343 12/1929 United Kingdom ............... 350/171

OTHER PUBLICATIONS

Wolfe, W. L. et al, (editor) "The Infrared Handbook" Environmental Research Institute of Michigan, pp. 7-17.

Primary Examiner—Bruce Y. Arnold
Attorney, Agent, or Firm—Kinney & Lange

[57] ABSTRACT

An interferometer spectrometer having a source of infrared analytical radiation, a fixed reflector, a moving reflector and a beam splitter for directing the analytical radiation to the reflectors. The beam splitter is formed of a semiconductor material which, in a preferred embodiment, is silicon. In a preferred physical embodiment, the beam splitter is configured as a wedge.

10 Claims, 2 Drawing Figures

SILICON BEAMSPLITTER

BACKGROUND OF THE INVENTION

1. Field of the Invention

Interferometer spectrometers are known to the prior art. Within that context, Michelson type interferometers have gained wide acceptance, particularly in the form that employs a beamsplitter to establish two independent optical paths with at least one path having a movable reflecting element.

2. Description of the Prior Art

To cover the range of 9000 cm$^{-1}$ to 10 cm$^{-1}$ in a conventional infrared prior art interferometer spectrometer, it has been necessary to employ alternative beamsplitters including quartz, CaF$_2$ and or KBr as well as a series of stretched mylar films of different thicknesses. These multiple beamsplitter requirements, dependent on the wavelength of interest, obviously complicate the setup of the instrument. Additionally, any required alteration in instrument setup provides an opportunity for error. Further, many of the materials which have been employed as beamsplitters in the prior art are hygroscopic which can result in experimental variation unless laboratory conditions are uniformly maintained.

SUMMARY OF THE INVENTION

The present invention provides a non-hygroscopic beamsplitter material which is particularly well suited for use in the mid to far infrared spectral region. In its broadest sense, the present invention consists of the use of a semiconductor material as a beamsplitter. Specifically, silicon, germanium and gallium arsenide are preferred with silicon being the most preferred. The preferred physical configuration is a wedge for beamsplitters intended for use at higher resolution.

DETAILED DESCRIPTION OF THE PREFERRED EMBODIMENTS

Figure 1:
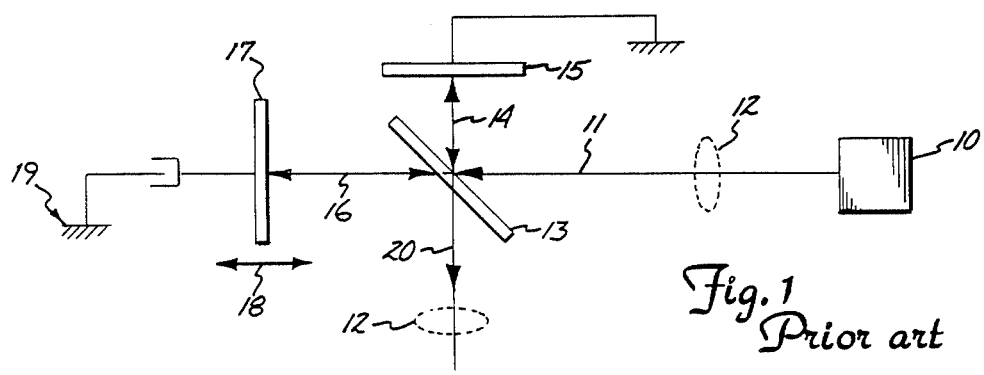
FIG. 1 illustrates the interferometer portion of a prior art interferometer spectrometer.

FIG. 1 diagramatically illustrates an interferometer of the Michelson type employed within an interferometer spectrometer known to the prior art. A source of analytical radiation, including associated optical elements for collimating and directing the analytical radiation to the interferometer, is illustrated at 10. The path of the analytical radiation through the interferometer is shown by a single line 11 with a circle 12 around the line 11 being used to represent the fact that the collimated beam of analytical radiation has a significant dimension. Within many commercial instruments of the type being discussed, the collimated radiation may have a diameter on the order of two or more inches. Analytical radiation follows the direction of the arrow head on line 11 to a beam splitter 13 which divides the beam to follow a first path 14, to and from a fixed mirror 15, and along a second path 16, to and from a movable mirror 17. The direction of movement of the movable mirror 17 is indicated by the arrows 18 while the mechanism for supporting and imparting motion to the mirror 17 is designated generally at 19. Reflected analytical radiation from the mirrors 15 and 17 is recombined by the beamsplitter 13 to exit the interferometer along the line 20, the extent of the beam following the line 20 again being indicated by the circle 12. Analytical radiation following the line 20 is directed to a sample compartment, in known manner.

The desired analytical radiation determines beamsplitter selection and often requires a beamsplitter change with a change in radiation wavelength selection. This requires setup time, at least, and provides an opportunity for setup error. In addition, many beamsplitter materials employed in prior art devices are hygroscopic which can result in experimental variation.

It is within the scope of the present invention to employ a semiconductor material as a beamsplitter such as the disks commonly produced within the semiconductor industry. For example, silicon, germanium and gallium arsenide may be employed, with silicon being preferred. These materials may be employed within the mid to far infrared spectral region, for example from 9000 cm$^{-1}$ to 10 cm$^{-1}$. With silicon, it is expected that the thickness will be between $\frac{1}{2}$ to 2 mm. Silicon is less opaque in the far infrared region so its thickness may be greater if that is the region of interest. In all embodiments discussed herein, the surfaces of the semiconductor material should be highly polished, to a level of 0.4 microns, for example.

It has been found that silicon, in the mid to far infrared regions, provides an almost perfect beamsplitter in that it has a 45% reflectance and 55% transmittance. As with other prior art beamsplitters, because of their finite thickness, there are two reflecting surfaces. Prior art beamsplitters have often required compensators to cope with this problem. Within the context of the present invention, and particularly in the far infrared region, the problems encountered as a result of the two reflecting surfaces may be dealt with adequately by making the beamsplitter thicker. This will result in a wider separation of the peaks resulting from the two surfaces, and, accordingly, a greater ability to discriminate between them. However, making the beamsplitter thicker also results in a greater absorption of energy.

Figure 2:
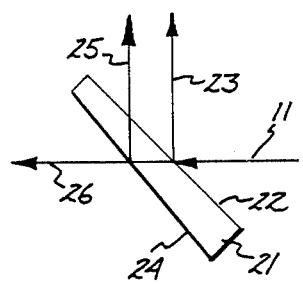
FIG. 2 illustrates the preferred configuration of a beamsplitter in accordance with the present invention.

An alternative to a thicker beamsplitter in accordance with the present invention is illustrated in FIG. 2 wherein a wedge shaped configuration is shown. Beamsplitter 21 shown in FIG. 2 may be of any of the materials described herein. The incident beam 11 is partially reflected by the leading surface 22 as illustrated at 23. A portion of the transmitted beam is reflected by the trailing surface 24 as illustrated at 25. The transmitted beam is illustrated at 26. As is known in the prior art, when these beams are reflected from the reflectors of the interferometer, such as 15 and 17 in FIG. 1, similar optical events occur. Thus, the need for compensation as known in the prior art. However, in the embodiment illustrated in FIG. 2, the beamsplitter 21 is wedge-shaped which results in an optical divergence of the peaks resulting from the surface 22 as opposed to the surface 24. Thus, the wedge shape facilitates detection of the desired peak without interference from the other.

Obviously, many modifications and variations of the present invention are possible in light of the above teachings. It is therefore to be understood that the invention may be practiced otherwise than is specifically described.

What is claimed is:

1. In an interferometer spectrometer of the type having a source of infrared analytical radiation, a fixed reflector, a moving reflector and beamsplitter means for directing said analytical radiation to said reflectors, the improvement wherein said beamsplitter is a wedge-shaped semiconductor material.

2. The interferometer spectrometer of claim 1 wherein said semiconductor material is silicon.

3. The interferometer spectrometer of claim 1 wherein said semiconductor material is germanium.

4. The interferometer spectrometer of claim 1 wherein said seimconductor material is gallium arsenide.

5. The interferometer spectrometer of claim 1 wherein said semiconductor beamsplitter has highly polished leading and trailing surfaces.

6. In an interferometer spectrometer of the type having a source of infrared analytical radiation, a fixed reflector, a moving reflector and beamsplitter means for directing said analytical radiation to said reflectors, the improvement wherein said beamsplitter is a semiconductor material having highly polished leading and trailing surfaces.

7. The interferometer spectrometer of claim 6 wherein said beamsplitter is configured as a wedge.

8. The interferometer spectrometer of claim 6 wherein said semiconductor material is silicon.

9. The interferometer spectrometer of claim 6 wherein said semiconductor material is germanium.

10. The interferometer spectrometer of claim 6 wherein said seimconductor material is gallium arsenide.

* * * * *